United States Patent Office 3,605,836
Patented Sept. 20, 1971

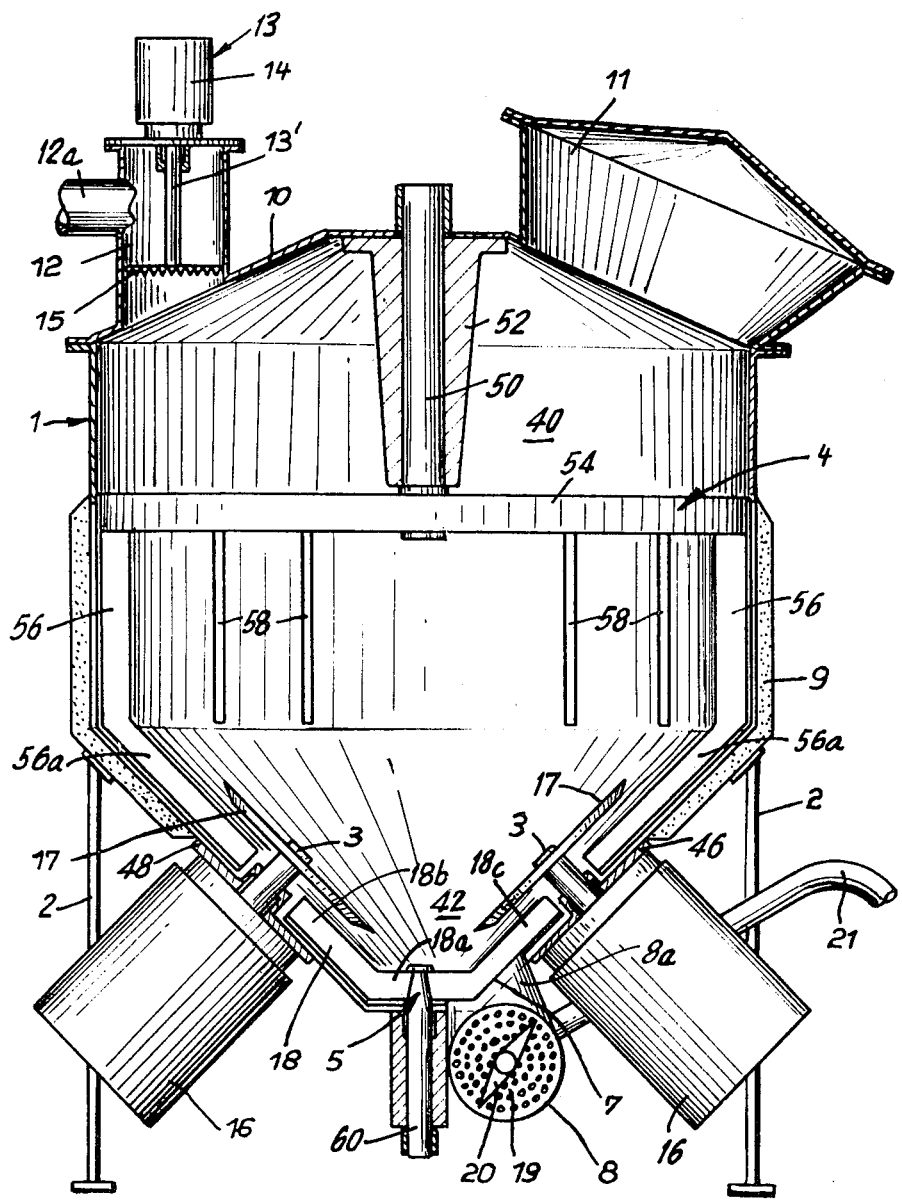

3,605,836
GRINDER WITH TEMPERATURE REGULATION AND STIRRING MEANS
Karl Schnell, Muhlstrasse 28, Winterback, near Stuttgart, Germany
Filed Dec. 11, 1968, Ser. No. 783,052
Claims priority, application Germany, Mar. 8, 1968, P 16 32 883.9
Int. Cl. B02c 18/12
U.S. Cl. 146—79                                   15 Claims

ABSTRACT OF THE DISCLOSURE

A grinder construction, particularly for grinding meat, bread and similar products includes a large size receptacle or vessel having means for selectively heating and cooling the contents to be treated therein. The lower end of the vessel is conically shaped and terminates in an opening or conduit connected to a fine grinding machine. At least one rotating coarse grinding wheel is located within the vessel adjacent one of the oblique conical walls in the vicinity of the discharge to the fine grinding machine. The vessel also contains an upper rotatable stirrer and a lower rotatable stirrer, the latter including blades which rotate past the opening to the fine grinder. A gas exhaust opening is defined at the upper end of the vessel and is advantageously connected to a vacuum pump so that processing can be effected under vacuum or air exclusion conditions so that the grinding material can be protected against acid and fermentation and can be stored for a longer period of time. A froth breaker is located in the gas discharge line adjacent the top of the vessel.

SUMMARY OF THE INVENTION

This invention relates in general to a material treating device, and in particular, to a new and useful comminuting device for meat, bread and similar products which includes a vessel which may be heated or cooled for the satisfactory treatment of the products during the operation and which includes grinding wheel elements which are arranged in a vessel adjacent the lower end thereof adjacent a discharge into a fine grinder.

The present invention is an improvement over the prior art, particularly, in respect to the provision of a vessel for grinding or comminuting products which includes means for heating or cooling the products as desired during the operation and for evacuating the air from the upper portion thereof and also includes means for coarse grinding the materials which are treated in the vessel. The vessel includes a lower conical wall with two oppositely arranged coarse grinding tools on these walls arranged in the vinicity of a discharge at the lower end of the conical portion. The coarse grinding tool arrangement makes it possible to charge the upper end of the vessel with the material to be ground in large pieces and to grind it effectively. The coarse grinding tools are preferably provided with propeller shaped sickel knives having a pitch such that the grinding material is pressed toward the inner wall of the vessel. The coarse grinding tools exert suction on the unground material arriving from the top and thus achieve a high through-put operation of the device.

In a further development of the invention, the vessel is provided with an upper and lower stirrer. The lower stirrer is arranged in the proximity of a discharge opening which connects to the inlet of a fine grinding machine. Both stirrers operate to mix the components of the charged material. The upper stirrer prevents a material from sticking to the vessel walls and ensures that the material is delivered to the coarse grinders. The lower stirrer conveys the grinding material which accumulates at the lowest point of the vessel back into the range of action of the knives of the coarse grinding tools until the grinding is carried out to the degree of fineness suitable for processing in a fine grinding machine. Both stirrers, the upper and the lower stirrer mix the components of the material which is charged to the vessel and the upper stirrer also prevents any sticking of the material to the walls of the vessel and prevents it from not being subjected to the coarse grinding. The lower stirrer conveys the grinding material which accumulates at the lowermost point back into the boiler into the range of action of the knives of the coarse grinding tools so that it has achieved a degree of fineness suitable for processing in the fine grinding machine. The blades of the lower stirring device advantageously form an angle with the radial plane extending through the axis of rotation of this stirrer and are advantageously located below and within the range of rotating blades of the coarse grinders. The blades of the stirring machines can preferably be driven in both directions and at least the lower stirrer is mounted so that its blades surmount the connection to the fine grinding machine. In this manner the stirring blades exert an upward thrust in one direction of rotation and in the other direction of rotation they press the coarse grounded material to the fine grinding machine, since the lower stirrer rotates above the opening connecting the fine grinding machine.

The apparatus also includes an upper gas discharge in which is mounted a rotating element providing a froth breaker which prevents the frothing of the device and which permits the carrying away of the gases without the carrying over of particles of ground material. The rotating member includes prongs formed on a disc which break the froth bubbles and direct the materials against the wall of the gas discharge pipe so that it returns backwardly into the vessel.

Accordingly, it is an object of the invention to provide an improved method for grinding material such as meat and similar products which includes a vessel having a lower wall portion with a discharge with top and bottom stirrers arranged to maintain material which is introduced therein in association with grinders which effect a coarse grinding of the material and wherein the lower end of the vessel contains a discharge which connects to a fine grinder.

A further object of the invention is to provide a grinding device which includes a vessel having means for heating the material or cooling the material which is be ground and which includes a gas escape pipe at its upper end having means for preventing frothing at this end.

A further object of the invention is to provide a grinding device with stirring means and grinding elements arranged to maintain the material in the vessel for the coarse grinding thereof and for thereafter directing the material downwardly through a discharge opening into a fine grinding machine.

A further object of the invention is to provide a grinding device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The only figure in the drawing is a schematic cross sectional view of a grinding device constructed in accordance with the invention.

DETAILED DESCRIPTION OF THE PREFERRED EMBODIMENT

Referring to the drawing in particular, the invention embodied therein comprises a vessel or boiler generally designated 1 which includes a cylindrical upper portion 40 and a frustoconical or unwardly sloping lower portion 42. The frustoconical lower portion 42 terminates in an opening 7 which comprises a discharge for the vessel 1 and an inlet to a fine grinder 8. The fine grinder 8 has a charging pipe 8a which communicates with the opening 7. The fine grinding machine 8 includes a perforated plate 19 having a rotating knife blade 20 arranged to rotate in front thereof. The fine material is delivered through the perforations of the plate 19 to an outlet pipe 21 which is connected for delivering the ground material to a receiving vessel or tank (not shown).

In accordance with the invention, the vessel 1 is mounted on legs 2, 2 so that oppositely arranged side walls 46 and 48 of the lower portion 42 may accommodate driving motors 16, 16 which are connected to rotate sickle like knives 17 of a coarse grinding device or tool 3.

An upper stirrer generally designated 4 includes a vertical shaft portion 50 which is rotatably mounted in a central piece 52 of the vessel 1 and a large diameter blade base 54 having wall conforming side stirrer elements 56, 56 and a plurality of intermediate vertically extending stirrer elements 58. The wall conforming stirrer elements 56 include angled or bent off portion 56a which extends along the respective walls 46 and 48 and underlie the sickel knives 17.

A lower stirrer generally designated 5 includes a vertical stirrer shaft 60 and a doubled angled stirrer blade 18 having a straight central portion 18a and angled side portions 18b and 18c which underlie respective half portions of the sickle knives 17, 17. The stirrer blade 18 is located over the fine grinder 8. The slide cover (not shown) is slidable in the plane of the drawing to close the opening 7 when desired.

The vessel 1 is surrounded by a jacket 9 which contains temperature regulating means e.g. means for feeding and/or cooling the vessel walls on the interior of the vessel.

The vessel 1 includes a cover 10 which carries the journal 52 and which is provided with a closeable filling opening 11. In addition, it includes a gas exhaust pipe 12 having a discharge 12a for gases which might generate during the grinding operation. A froth breaker 13 is mounted in the discharge pipe 12 and in it includes a driving motor 14 for rotating a shaft 13' having a disc member 15 with pronged elements thereon. The pronged element disc 15 when driven by the motor 14 will cause the froth bubbles which may rise from the material being ground to be broken by whirling them outwardly against the wall of the pipe 12. Any material which is carried along by this operation is thrown against the wall and returns backwardly down into the vessel 1. In some instances a vacuum pump (not shown) is connected to the discharge opening 12a in order to provide a means for rapidly withdrawing the generated gases.

The operation of the device is as follows:

Material to be ground is charged through the filler opening 11 and the upper stirrer 4 and the lower stirrer 5 are rotated together with the grinding tools 3, 3. The material may be heated during the operation by actuating the heating means 9. The upper stirrer acts to detach the material which adheres to the boiler walls of the vessel 1 and push it into the range of action of the coarse grinding tools 3, 3. The tools 3, 3 which are provided with propeller shaped sickle knives 17 and which are arranged at opposite sides of the lower portion 42 rapidly grip and grind the contents of the vessel which will move by its own weight downwardly into the sickle knives. An additional suction is produced by the propeller shaped sickle knives 17 which have a pitch such that they press the grinding material to the inner wall of the boiler and set into circulation.

The lower stirrer ensures that no blind angle will be formed in the lower part of the vessel 1 in which the grinding material may be out of reach of one of the circulating devices and provides a means for circulating a material being ground upwardly into the vicinity of the grinding tools 3.

The stirring blades 18 surmount the charging hole or opening 7 which feeds to the fine grinding machine 8. The material may be coarse ground, boiled and subject to a vacuum in the vessel 1 while the opening 7 is closed by a slide (not shown). For fine grinding the slide is removed from the charging opening 7 and the stirring blades 18 are rotated in a direction in which they press the material which has already been coarse ground into the charging opening 7.

I claim:

1. A grinding machine particularly for grinding meat, bread and similar products comprising a vessel having a charging opening adjacent the top and a material discharge adjacent the bottom which is adapted to be connected to a fine grinding machine, temperature regulating means associated with said vessel for controlling the temperature of the products within said vessel, an exhaust gas discharge connected into said vessel adjacent the upper portion therof, coarse grinding means located within said vessel for coarse grinding materials, and a froth breaker arranged in said exhaust gas discharge for breaking the froth tending to accumulate at the upper portion of the materials being treated in said vessel.

2. A grinding machine particularly for grinding meat, bread and similar products comprising a vessel having a charging opening adjacent the top and a lower sloping wall leading to a material discharge adjacent the bottom which is adapted to be connected to the fine grinding machine, temperature regulating means associated with said vessel for controlling the temperature of the products within said vessel by selective cooling and heating, a gas discharge connected into said vessel adjacent the upper portion thereof, and coarse grinding means located within said vessel for coarse grinding materials comprising at least one rotatable propeller having a blade mounted for rotation in a plane substantially parallel to said sloping wall.

3. A grinding machine particularly for grinding meat, bread and similar products comprising a vessel having a charging opening adjacent the top and a material discharge adjacent the bottom which is adapted to be connected to the fine grinding machine, temperature regulating means associated with said vessel for controlling the temperature of the products within said vessel by selective cooling and heating, a gas discharge connected into said vessel adjacent the upper portion thereof, and coarse grinding means located within said vessel for coarse grinding materials, the lower portion of said vessel including oppositely arranged inwardly sloping wall portions, said coarse grinding means comprising first and second coarse grinding tools rotatably mounted in said vessel on respective ones of said sloping wall portions and having blades mounted for rotation in a plane substantially parallel to their associated sloping wall.

4. A grinding machine particularly for grinding meat, bread and similar products comprising a vessel having a charging opening adjacent the top and a material discharge adjacent the bottom which is adapted to be connected to the fine grinding machine, temperature regulating means associated with said vessel for controlling the temperature of the products within said vessel by selective cooling and heating, a gas discharge connected into said vessel adjacent the upper portion thereof, coarse grinding means located within said vessel for coarse grinding materials, and an upper stirrer rotatably mounted in said vessel about a substantially vertical axis and a lower stirrer rotatably mounted in said vessel and rotatable about a substantially vertical axis and including a blade portion which rotates over said material discharge, said lower stirrer including a stirring blade having a central planar portion and an oblique portion on each side extending parallel to and overlying the walls of said vessel, said sloping walls of said vessel adjacent said stirrer being of generally conical configuration.

5. A grinding machine particularly for grinding meat, bread and similar products comprising a vessel having a charging opening adjacent the top and a material discharge adjacent the bottom which is adapted to be connected to the fine grinding machine, temperature regulating means associated with said vessel for controlling the tempertaure of the products within said vessel by selective cooling and heating, a gas discharge connected into said vessel adjacent the upper portion thereof, coarse grinding means located within said vessel for coarse grinding materials, said vessel including a lower portion having opposed inclined walls, said discharge opening being located adjacent the lower end of said opposed inclined walls, said coarse grinding means comprising first and second grinder elements mounted on respective inclined walls each including a reversible driving motor, and a rotatable blade mounted for rotation about an axis substantially perpendicular to its associated one of said inclined walls and rotating in a plane substantially parallel to and spaced from the associated one of said inclined walls, lower stirring device comprising a rotatable blade having an oblique portion extending substantially parallel to said inclined walls and which forms an angle with the radial plane extending through the axis of rotation of said blade.

6. A grinding machine, according to claim 3, wherein said grinding tools comprise propeller shaped sickle knives having a pitch such that they press the grinding material in a direction toward the associated sloping wall.

7. A grinding machine, according to claim 2, including an upper stirrer rotatably mounted in said vessel about a substantially vertical axis and a lower stirrer rotatably mounted in said vessel and rotatable about a substantially vertical axis and including a blade portion which rotates over said material discharge.

8. A grinding machine, according to claim 5, wherein said lower stirrer is mounted over said material discharge opening and including an upper stirrer arranged above said coarse grinding blades and including a stirrer blade rotatably mounted about a substantially vertical axis.

9. A grinding machine, according to claim 1, wherein said froth breaker comprises a rotatable disc having downwardly extending prong portions.

10. A grinding device comprising a substantially cylindrical vessel having a lower substantially conical portion terminating in a lower discharge opening adapted to be connected to an inlet of a fine grinding machine, means defining a charging opening adjacent the upper portion of said vessel, a gas discharge line connected to the upper portion of said vessel for evacuating gases therefrom, an upper stirrer rotatably mounted adjacent the upper portion of said vessel and including a stirrer blade mounted for rotation about a substantially vertical axis and having a blade portion extending downwardly along side the interior wall of said vessel, first and second coarse grinding machines mounted on said conical portion of said vessel at respective opposite sides thereof, said first and second coarse grinding machines each including a rotatable coarse grinding blade mounted for rotation about an axis substantially perpendicular to the axis of said associated conical mounting wall, and a lower stirrer comprising a rotatable stirrer blade mounted for rotation about an axis which is substantially vertical, said lower stirrer blade including oblique blade portions which overlie the discharge opening.

11. A grinder device, according to claim 10, including an inlet line for a fine grinding machine connected to said discharge, said fine grinding machine including a perforated disc to which the material is adapted to be passed.

12. A grinder device, according to claim 10, wherein said lower stirrer blade rotates below said coarse grinder and has a pitch such that in one direction of rotation the material is directed back to the coarse grinders and in an opposite direction the material is withdrawn from the vessel through the discharge opening.

13. A grinder device, according to claim 10, wherein said upper stirrer blade portions include oblique arms which extend parallel to and spaced from the conical lower wall portion and at least a portion of which extends below the coarse grinding blades of each of first and second coarse grinders.

14. A grinder device according to claim 13, including motor means connected to said coarse grinder blades for rotating said blades and selected directions of rotation.

15. A grinder device, according to claim 10, including a froth breaker mounted in said discharge line comprising a rotatable disc having projections on one surface thereof for breaking the froth at the upper portion of said vessel.

References Cited
UNITED STATES PATENTS

| | | | |
|---|---|---|---|
| 2,843,169 | 7/1958 | Stein | 146—68 |
| 3,313,332 | 4/1967 | Stephan et al. | 146—79X |
| 3,461,934 | 8/1969 | Waters | 146—79 |

WILLIE G. ABERCROMBIE, Primary Examiner